May 14, 1968 C. D. BOCK ETAL 3,382,723
LIMIT STOPS FOR THE INERTIAL MASSES OF ACCELEROMETERS
Filed Oct. 3, 1963 2 Sheets-Sheet 1

INVENTORS:
CHARLES D. BOCK
CHARLES WARD
BY Howson & Howson
ATTYS.

INVENTORS:
CHARLES D. BOCK
CHARLES WARD
BY Howson & Howson
ATTYS.

3,382,723
LIMIT STOPS FOR THE INERTIAL MASSES OF ACCELEROMETERS
Charles D. Bock, Plainview, and Charles Ward, Westbury, N.Y., assignors to American Bosch Arma Corporation, Garden City, N.Y., a corporation of New York
Filed Oct. 3, 1963, Ser. No. 313,704
1 Claim. (Cl. 73—517)

The present invention relates to accelerometers and has particular reference to vibrating-string accelerometers and means for increasing their resistance to damage.

The typical vibrating-string accelerometer uses a proof mass connected between a pair of tensioned, axially-aligned, transversely-vibrating, elongated members referred to as strings, mounted on a frame. An acceleration of the frame along the axis of the strings causes the tension in one string to increase and that in the other string to decrease. The result is that the natural frequencies of the strings change in opposite direction and the difference in frequencies is a measure of acceleration. In precise instruments the proof mass may be divided into two axially-separated parts which are connected together by a resilient member or soft spring. The soft spring maintains string tension at a relatively constant value despite minor changes in dimensions of the accelerometer frame.

It had been found that the strings of a vibrating-string accelerometer were breaking in the vibration environment expected to be encountered by the accelerometer when installed. For example, an accelerometer on a missile is subjected to high-amplitude sustained vibration during the initial launching stage of flight, prior to use of the accelerometer for measurement. To be operative, the accelerometer must be capable of withstanding such vibrations and be ready to provide meaningful indications of acceleration when the vibrations cease. It was previously believed that string rupture was due to excessive stretching of the strings beyond their normal breaking points during periods of high accelerations due to vibrations, and that stops were required to limit the displacement of the mass with respect to the frame in the direction tending to increase string tension.

However, as a result of tests made on a number of strings we found that such strings were capable of withstanding steady tensions much greater than the tensions imposed by the above-mentioned strong-vibration environment. Critical reexamination of string-breakage conditions led to the conclusion that breakage was due to buckling of the strings, rather than to tension alone. This buckling, occurring repeatedly and alternating with tensioning of the string during vibration, apparently weakened the string by fatiguing it, so that it failed more easily when subjected to tension. In addition the change from a slack to a taut condition produced a transient stress greater than would be produced normally by the same tension on a continuously-taut string.

In accordance with the invention, mechanical stops are placed in a position which insures that buckling will be prevented in the strings at all times, thus eliminating the harmful condition referred to above. As a result, breakage of strings of a given original strength is greatly reduced.

For a more complete understanding of the invention, reference may be had to the accompanying diagrams in which FIG. 1 is a section through the longitudinal axis of an accelerometer according to a preferred embodiment of the invention;

Figure 1:
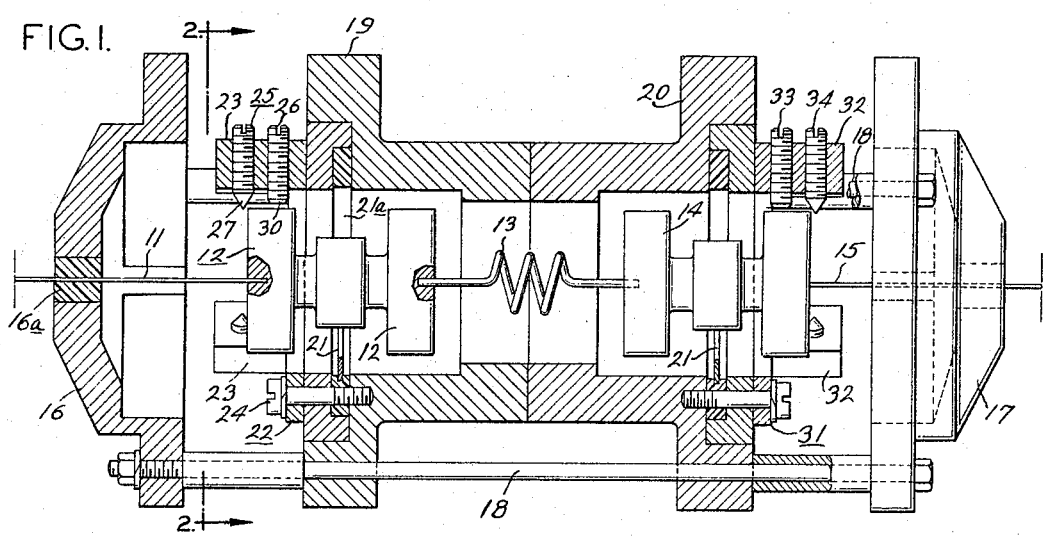
Figure 2:
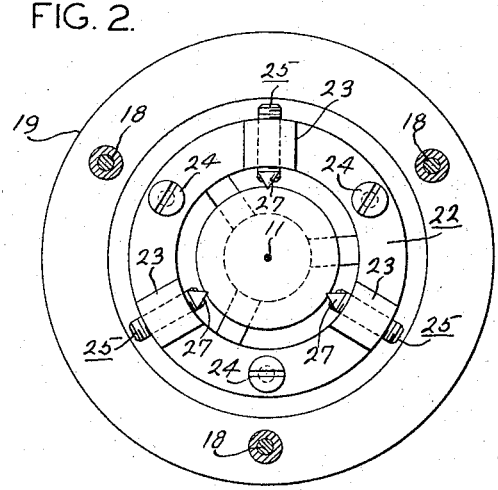
FIG. 2 is an end view of a portion of the accelerometer of FIG. 1, taken along the line 2—2.
Figure 4:
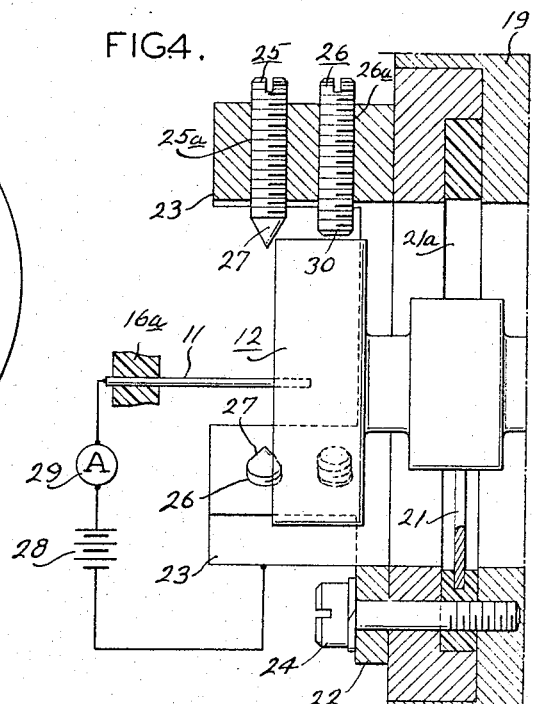
FIG. 4 is an enlarged view of a portion of FIG. 1 together with a schematic representation of electrical apparatus preferably used for adjustment purposes.

Referring now to FIGURES 1–4, there is shown the general arrangement of a vibrating-string accelerometer in which vibrating string 11, mass 12, center spring 13, mass 14 and vibrating string 15 are connected in line between the two opposite end supports 16 and 17, which are rigidly connected together by the tie rods 18. Also supported by the tie rods 18 are the cross-tape supporting rings 19, 20 to which one end of each of a plurality of cross-tapes such as 21 are connected, the other ends of the cross-tapes being attached to the masses 12 and 14 to support mass 12 from ring 19 and mass 14 from ring 20. The cross-tapes such as 21 permit only forces along the strings 11 and 15 to displace the masses with respect to the supporting rings, end supports and tie rods which constitute the frame. An acceleration of the frame to the right in FIGURE 1 will cause the masses 12 and 14 to apply forces to the left to the strings 11 and 15, thereby upsetting the initial balanced tension condition by increasing the tension in string 15 while decreasing the tension in string 11. The change in tension is monitored in known manner by suitable apparatus which causes the strings to vibrate at their natural frequencies and which indicates the difference between the frequencies of the two strings. The type of device thus far described in detail is well known in the prior art.

When the above-described accelerometer is installed in a guidance system in a missile for example, the accelerometer is subjected to intense vibrations during initial stages of flight, particularly in the launch period. These intense vibrations have resulted in breakage of strings 11, 15, and it was previously thought that this was because the vehement vibratory excursions of the masses 12, 14 caused the tension in the strings to exceed the normal breaking point. However, investigation of the failures led to the conclusion that the strings were not breaking because of excessive tension alone. The important factor was that as the vibrating masses moved in the direction tending to decrease the tension in one of the strings, over-travel removed all of the tension in that string and allowed it to slacken and buckle. Repeated buckling under vibration apparently weakened the string so much that the tension to which the string was subjected caused the weakened string to rupture, even though this tension would not have ruptured a string which had not been so weakened.

In accordance with the invention a stop is provided to prevent the mass from being displaced through a distance great enough to remove all tension on the string and permit buckling thereof, while permitting the mass to move without interference through the travel distance required for normal acceleration measurement. Furthermore it was found that, with the close tolerances involved in manufacture of accelerometers, it was highly desirable for the position of the stop to be adjustable to make sure that the above requirements were met.

Figure 3:
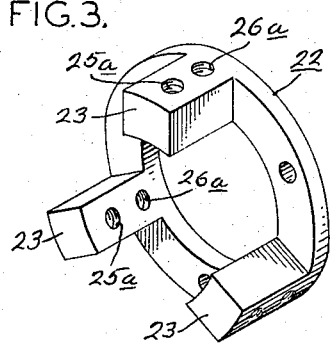
FIG. 3 is a perspective view of one part of the structure of FIGURES 1, 2 and 4.

One particular form of stop which fulfills these needs is illustrated in FIGURES 1, 2, 3 and 4. A ring 22 with three projecting legs 23 shown in FIGURE 3 is attached to the cross-tape support ring 19 by screws such as 24.

Two screws such as 25 and 26 are inserted in each of the tapped holes such as 25a, 26a shown in FIGURE 3, which holes pierce each of the legs 23. On each leg 23 the front screw 25, i.e. that one which is located on the outer or string end of the leg 23, has a conical end portion 27 as shown in detail in FIGURE 4, and is positioned so that, in the normal or zero-acceleration condition of the accelerometer, the conical portion 27 will contact the mass 12 at some point as the screw is caused to travel downwardly toward the mass by rotating the screw. The screw 25 is so moved downwardly into contact with mass 12 and then backed off from this contact position by turning the screw a predetermined amount, thereby establishing a predetermined horizontal separation between the mass 12 and the conical surface 27. The screw 25 is preferably locked in the latter position, as by applying thereto adhesive compound such as "Loklite," for example.

For ease of making the latter adjustment of screw 25, advantage may be taken of the electrical insulation provided between string 11 and end support 16 by insulating plug 16a, and between each cross-tape 21 and the supporting ring 19 by the insulating ring 21A. An electrical circuit comprising a power supply 28 and a continuity indicator 29, which may be a meter or light bulb, is connected between the ring 22 and string 11. The indicator 29 will then show when the screw 25 has been advanced into contact with mass 12 to provide a closed electrical circuit. It will be understood that the electrical connection to string 11 is easily made, because electrical connections or leads must be brought out from the strings in any case for connection to electronic oscillators and the leads are therefore readily available. Since all the other parts of the accelerometer are metal and electrically conductive, connection to ring 22 may be made anywhere on the supporting frame. The screw can then be retracted from the so-indicated contact position by turning the screw 25 a known amount to back it off from mass 12 and to provide limited longitudinal freedom of motion for the mass.

In a typical example, wherein masses 12 and 14 have the same weight of the order of 10 grams, each of the strings 11 and 15 may be in the form of tapes of beryllium copper approximately 20 mils in width and 2 mils in thickness, the freely-vibrating portion of each string adjacent each mass being about ¾ inch in length. Typically the string is initially stretched about 1.5 mils when mounted and subjected to zero acceleration along its length. Such a string will stretch about 0.02 mil for each additional $g$ of acceleration applied to the accelerometer. The longitudinal stop screw is retracted from its contact position to provide a longitudinal spacing of about 2.5 mils. Using as the stop a No. 6-40 screw with a 60° cone at its end, this spacing will be produced by about $\frac{1}{6}$ turn of withdrawal of the screw. This insures that the mass can never move appreciably past the zero-tension position; in this example the travel past the zero-tension position is limited to less than 0.2% of the free length of the string. Accordingly travel of mass 12 is limited in the buckling direction so as to prevent distortion of the string. Without the stop, the soft null spring 13 would allow an excursion of mass 12 sufficient to cause harmful buckling of the string.

It has been found advantageous also to limit the radial motion of the mass 12 at the string end in order to limit flexure of the string 11 where it is clamped to the support 16 and mass 12, lest fatigue of the string occur at the latter point. To this end a screw such as 26 having a flat lower end 30 is provided on each of the legs 23 adjacent and radially spaced from the outer surface of mass 12. The position of screw 26 may be adjusted in the same way as screw 25, i.e., by initial contact with mass 12 and then backing off a certain amount to provide the desired clearance between mass 12 and screw 26. This will tend to keep the mass 12 from being cocked with respect to the string 11. Limiting the cocking motion of the mass 12 will reduce flexure of the strings 11 and thereby reduce the fatigue and prevent premature rupture of the string.

Each of the three legs 23 on the ring 22 is provided with the two screws such as 25 and 26, and all screws are adjusted individually as described above. A similar stop structure including ring 31 having three arms such as 32 and screws 33, 34 is attached to the supporting ring 20 adjacent to the proof mass 14 to prevent motion of the proof mass 14 tending to buckle or unduly flex the string 15, in the same manner as described above with reference to limiting the motion of mass 12.

In the preferred embodiment of the invention the accelerometer is designed to measure steady or slowly changing accelerations greater than one $g$, e.g. up to about 10 $g$, where "$g$" is the conventional symbol for the acceleration of gravity at the surface of the earth. The string members 11 and 15 selected therefore have a breaking point in excess of the tension produced by 10 $g$ acting on the accelerometer. However it is desirable to make the strings no stronger than necessary since the characteristics of the strings producing increased strength generally produce reduced sensitivity and accuracy of acceleration measurement. Accordingly the strings preferably have breaking points only high enough to provide a reasonable margin of safety when operating at the maximum contemplated steady acceleration, and the stop means described above prevent their weakening during vibration to such an extent that they will rupture when later used to measure steady accelerations in the contemplated normal range.

Other embodiments of the invention will readily occur to one skilled in the art. The scheme shown in FIGURES 1-4 has been successfully applied to correct a deficiency in existing accelerometers by relatively simple modifications thereof. In equipment initially designed to incorporate the invention, the support structures 19, 20 would themselves ordinarily include provision for the stop elements such as the screws 25 and 26.

Figure 5:
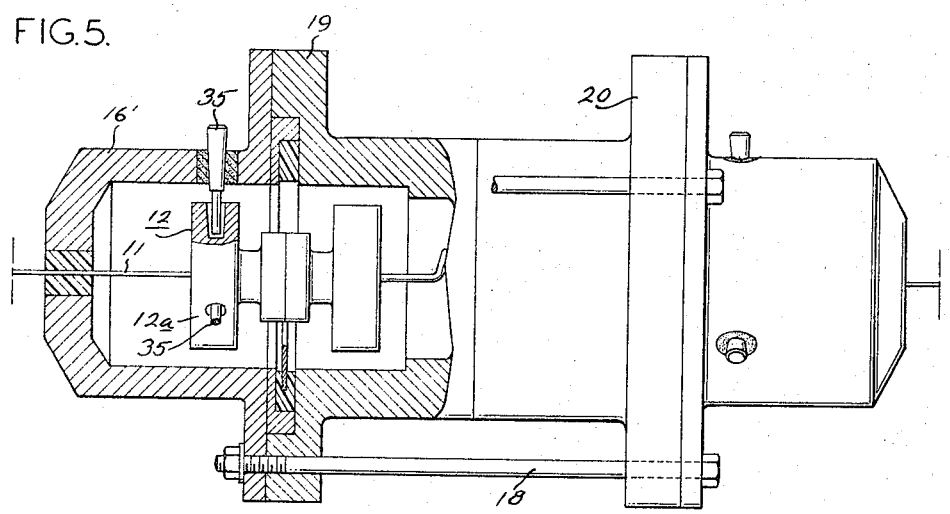
FIG. 5 is a view, partly in section, of a portion of another embodiment of the invention.

FIGURE 5 shows a stop arrangement using tapered pins such as 35 in place of screws 25, 26, which pins the mass 12 has been designed to accept in recesses provided therein. In this case the pins 35 are supported in a modified form of end support 16' which extends to, and is fastened directly to, ring support 19, the pins preferably being provided in the desired form and position by a novel method described hereinafter. The opposite end of the accelerometer is preferably constituted and made in a similar way, but in other respects the accelerometer of FIGURE 5 may be substantially identical with that of FIGURE 1.

Figure 6:
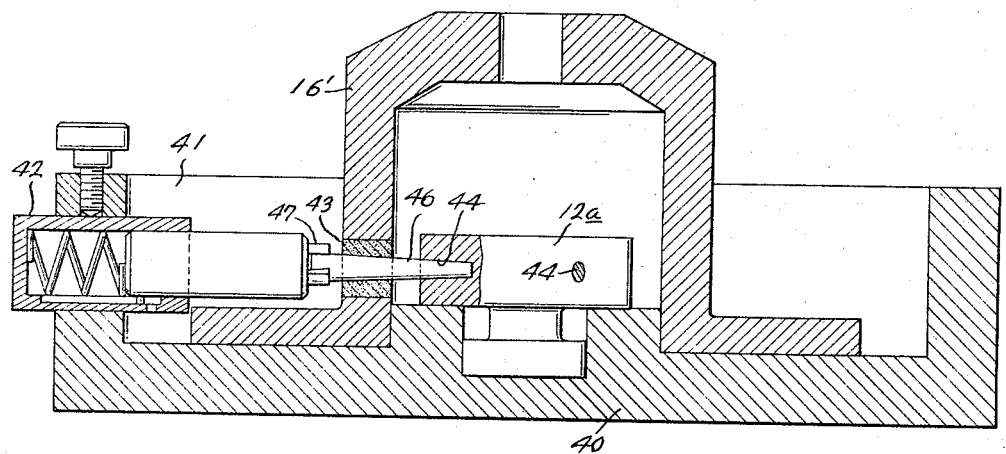
FIG. 6 is a sectional view of apparatus useful in fabricating the apparatus of FIG. 5.

More particularly, it has been found advantageous to have a means for holding the mass member such as 12 in fixed position with respect to the end piece 16' during assembly or re-assembly of an accelerometer of the type described. As shown in FIGURE 6, this may be accomplished by first positioning end support 16' and the mass piece 12A, which is a part of mass 12, on a fixture base 40 so as to hold support 16' concentric with piece 12A. Fixture base 40 includes a circumferential upright member 41 which supports three spring cartridges such as 42 positioned at 120° intervals around support 16'. Support 16' is provided with three 120°-spaced apertures each containing a bushing such as 43 of a low-melting point alloy, for example Cerroloy. Piece 12A is provided with recesses such as 44, also spaced about its periphery at 120° intervals. Each bushing and each recess is aligned angularly with the axis of a different one of the cartridges, and a tapered pin such as 46 positioned between the exposed end of each cartridge and its adjacent bushing so as to urge the smaller end of the pin against the bushing and toward the associated recess in piece 12A. Each bushing is then heated to soften it, as by passing an electrical current between each pin and its associated bushing, so that each pin advances through its bushing and into its associated recess. Each recess is shaped to conform with the tapered end of the pin inserted therein so that the pin seats itself substantially in contact with the sides and bottom of the recess. The larger end of the pin in each case is held only loosely by a chuck 47 on the end of each spring cartridge, so that this end of the pin may move normally to its axis to the extent required in mating perfectly with the surfaces of its corresponding recess, this motion being permitted by the softened bushing. When all three pins are seated in their recesses in piece 12A, the bushings are allowed to cool and harden to provide a firm bushing surface around each pin. The support 16' carrying piece 12A by means of the pins such as 46 is then removed from the fixture base 40. The pins are removed so that mass piece 12A can be disassembled to permit assembly of other parts of the accelerometer, but upon complete reassembly of the accelerometer the pins are reinserted to hold mass piece 12A in its original relative position with respect to support 16'. Prior to use of the accelerometer the pins are normally removed and stored with other tools and fixtures to be employed in future disassembly or repair of the accelerometer.

However, in accordance with our invention in this aspect each removed pin such as 46 is ground down, axially at its smaller end to shorten it, and circumferentially at its smaller end to reduce the diameter of the portion thereof which was inserted into the recess in the mass piece 12A. This is done in such manner that when each pin is seated in its bushing a predetermined clearance will be provided between the smaller, ground-off, end of the pin and the bottom of the corresponding recess in the mass piece 12A, and between the circumference of the pin and the adjacent walls of the recess, as shown in FIGURE 5 wherein mass piece 12A is shown assembled integrally with the complete mass 12. An adhesive is preferably applied between the pins and their bushings to hold them in place without the danger of softening the bushings which soldering might entail.

Figure 7:
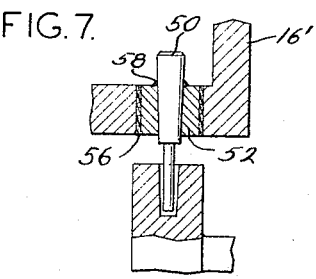
FIG. 7 is a fragmentary view, partly in section, illustrating an alternative form of a portion of the apparatus of FIG. 5.

As shown in FIGURE 7, an alternative construction and assembly procedure may be used in which the pin 50 and the bore in a hard metal bushing 52 are first accurately machined to mate accurately with each other. The pin is assembled in the bushing and the bushing inserted through the hole in the support 16' to seat it in the recess in the accelerometer mass. The bushing is then cemented to the support, preferably with an insulating cement 56 such as an epoxy resin, thereby fixing the bushing in its proper position and also providing convenient electrical isolation between the mass and the support. As in the previously-described construction of FIGURE 5, the pin is then removed, ground down as shown to provide the desired clearance, reinserted in the bushing, and held in place in the bushing by a cement 58.

It will be understood that a similar procedure will normally be performed with respect to the opposite end of the accelerometer.

The pins such as 35 and 50 therefore act as stops limiting the motion of the mass in all directions to the distance set by the clearances in the recesses in the masses, which clearances are made sufficiently large to permit motion of the mass during normal measurement of acceleration, but sufficiently small to prevent that degree of axial or transverse motion which would produce buckling and fatigue of the vibrating string members.

While the invention has been described with particular reference to specific embodiments thereof, it will be understood that it is susceptible of embodiment in a variety of diverse forms without departing from the scope and spirit of the invention as defined by the appended claim.

We claim:

1. The method of providing an accurately-positioned stop for arresting the motion of a conductive proof-mass member mounted from the frame of an accelerometer, comprising:
   applying a voltage between said conductive proof-mass member and said stop while advancing said stop toward said proof-mass member;
   detecting the current produced between said stop and said proof-mass upon the occurrence of contact between said stop and said proof-mass;
   retracting said stop from contact with said proof-mass by a predetermined amount; and
   fixing said stop to said frame in said retracted position.

References Cited
UNITED STATES PATENTS

| | | | |
|---|---|---|---|
| 2,835,774 | 5/1958 | Statham | 73—517 X |
| 2,930,863 | 3/1960 | Pasieka | 73—517 X |
| 2,959,965 | 11/1960 | Holmes | 73—517 |
| 2,968,950 | 1/1961 | Dunbar et al. | 73—517 |
| 3,002,391 | 10/1961 | Holmes | 73—517 |

JAMES J. GILL, *Primary Examiner.*

BENJAMIN A. BORCHELT, *Examiner.*

W. ROCH, *Assistant Examiner.*